July 8, 1958     C. R. SKINNER     2,842,629
AUTOMATIC VALVE
Filed July 23, 1957                                   2 Sheets-Sheet 1
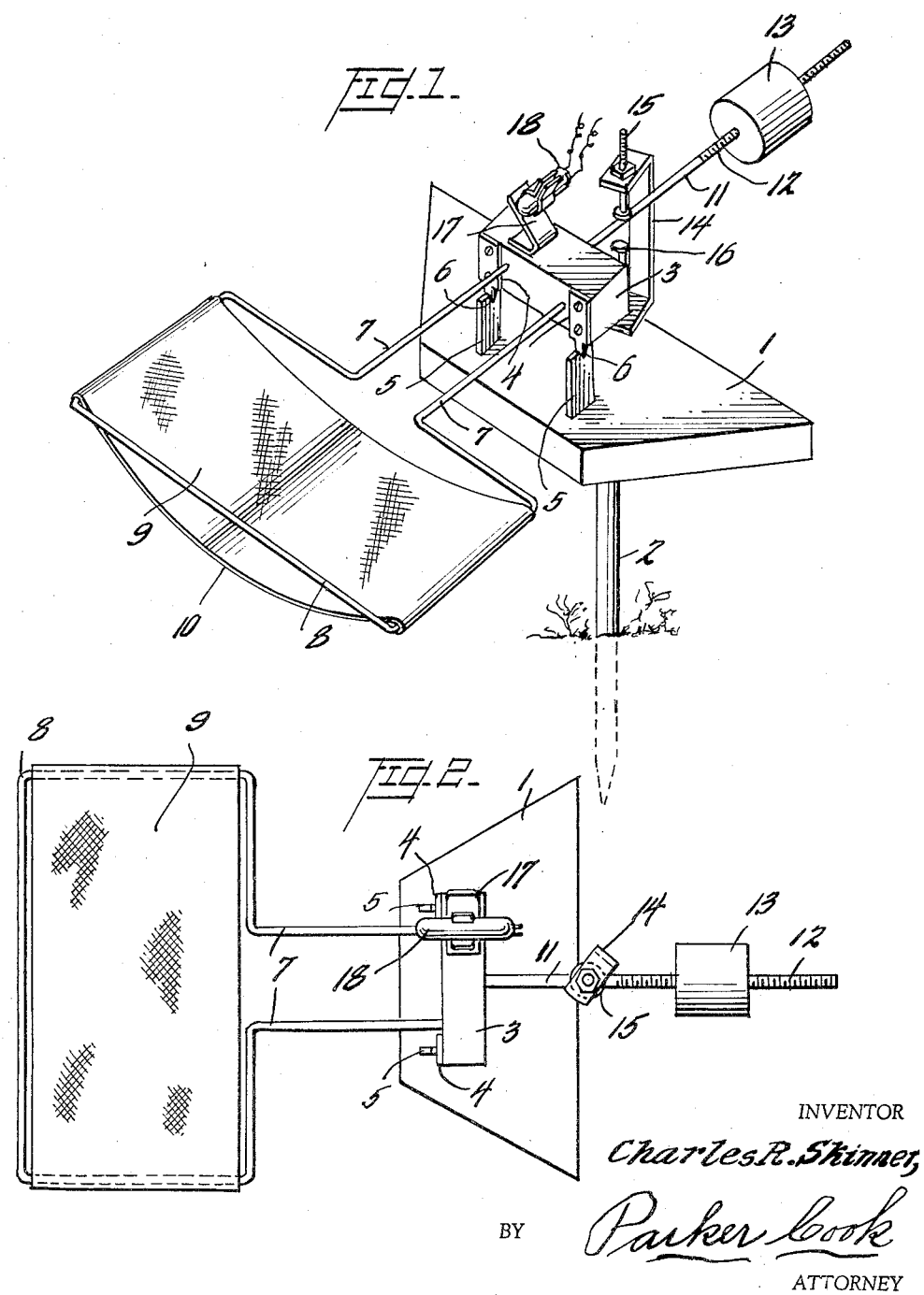
INVENTOR
Charles R. Skinner,
BY Parker Cook
ATTORNEY July 8, 1958 C. R. SKINNER 2,842,629
AUTOMATIC VALVE
Filed July 23, 1957 2 Sheets-Sheet 2
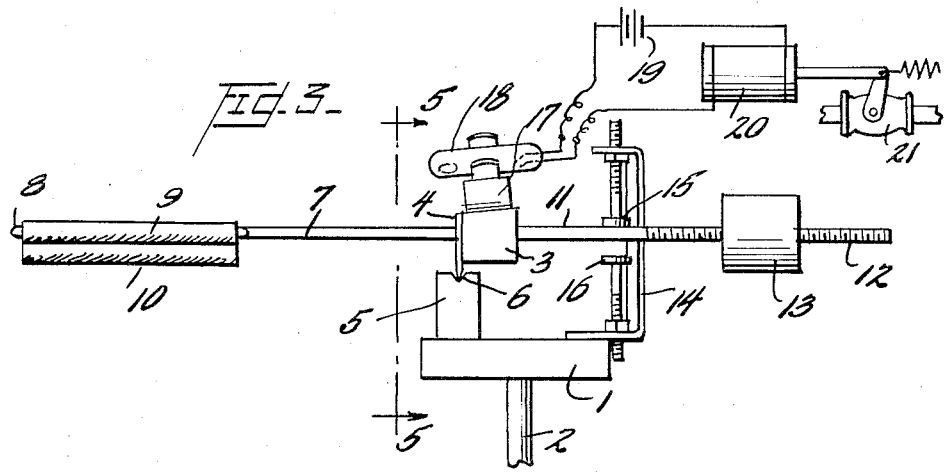
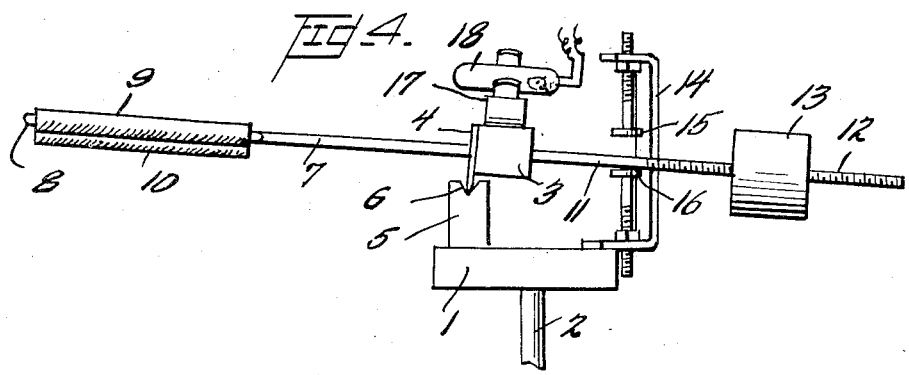
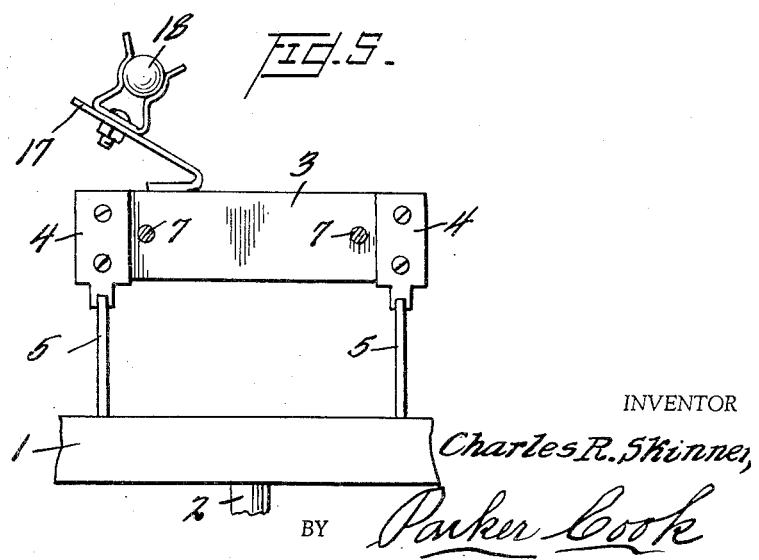
INVENTOR
*Charles R. Skinner,*
BY *Parker Cook*
ATTORNEY

United States Patent Office 2,842,629
Patented July 8, 1958

2,842,629

AUTOMATIC VALVE

Charles R. Skinner, Newfield, N. J.

Application July 23, 1957, Serial No. 673,688

2 Claims. (Cl. 200—61.07)

My invention relates to an automatic valve, adapted for greenhouses, so that after the valve is once adjusted, it will automatically cut in and cut off the water when the ground about the plants needs watering, and after the valve is once set, it will not have to be further adjusted.

I have found after various experiments that if I take a nylon or Dacron cloth carried by a frame and position the same under a spray nozzle and then adjust a weight on the stem opposite the frame, as soon as the cloth becomes saturated the frame will lower itself, overcoming the weight on the stem, and turn off a mercury switch; and, by the time the cloth dries, the weight will overbalance the weight of the frame and the Dacron cloth, and allow the frame and its cloth to move to its upward position, which allows the mercury switch to be thrown to turn on the water and again spray the plants in the greenhouses.

Another object of the invention is to provide an automatic valve that is used in greenhouses for the propagation of plants, wherein the spray is on from twenty to thirty seconds in which time a cloth carried by a frame becomes saturated beneath a sprinkler head and then, depending on the heat and humidity, by the time the cloth dries, which may be anywhere from one to ten hours, the frame will rise and again indirectly turn on the spray for twenty to thirty seconds to again moisten the ground, so that the flowers in the greenhouses are always sprayed when the soil becomes dry.

Heretofore, it has been necessary to manually turn on a valve for an overhead spraying system and spray the plants, and there was no accurate way of telling when the plants should be sprayed.

In the present invention, the valve is a very delicate one, and after it is once adjusted it will control spraying nozzles in the greenhouses; and when the plants need spraying, the valve will automatically turn on, and when the plants have been sprayed enough, the valve will automatically cut off the water supply.

Generally speaking, the valve consists of a rectangular frame, having the ends of its frame secured in a block, while carried by the frame is a nylon or Dacron cloth.

Extending from the rear of the block is what I term a "stem" on which there is an adjustable counter-weight. The block is mounted on two uprights, and the counter-weight is so adjusted that when the cloth becomes saturated, it will over-balance the counter-weight and lower itself, and will stay in its lower position until the cloth dries, when again the counter-weight over-balances the weight of the frame and the Dacron cloth.

Mounted on the block is a mercury switch, which is connected to a water inlet valve, and when the frame is in its lower position, the mercury switch will operate to cut off this supply valve. When the cloth becomes dry, this evenly balanced first-mentioned valve will cause the counter-weight to raise the frame and the mercury switch will again be thrown on to operate the supply valve.

Of course, the valve can be used for outside irrigation and placed under a spray nozzle, but its greatest use is in greenhouses so that the soil in which flowers or plants are set will always be moist but not ever saturated.

With these and other objects in view, the invention consists in certain new and novel arrangements and combination of parts, as will hereinafter be explained and pointed out in the claims.

Referring now to the drawings, showing a preferred embodiment,

Fig. 1 is a perspective of my automatic valve, but not showing a sprinkler over the valve, Fig. 2 is a top plan view of the same, Fig. 3 is a side elevation, showing a part of the valve mechanism in its lowermost position to cut off the sprinkler system (not shown), Fig. 4 is a similar side elevation, but showing a part of the valve mechanism with its cloth dried out, in its upward position, so that the water may be turned on to dampen the cloth in the valve, and Fig. 5 is a sectional view taken on line 5—5 of Fig. 1.

Referring now to Fig. 1, there is shown a platform 1 with a stake 2 that is to be sunk in the soil in the greenhouse. Also there may be seen a block 3 which has the blade 4 at its forward edge, which blade 4 rests in standards 5, having the V-depressions 6.

Extending from this block 3 are the rods 7 which are bent to form a rectangular frame 8, over which is sewed the cloth 9, which is preferably of nylon or Dacron. It will be noticed that this cloth 9 is not fastened to the sides of the frame but sags as at 10 so that it will not hold water, but just get saturated.

Extending from the rear of the block 3 is what I term a stem 11 which is threaded as at 12 and which has a counterweight 13 thereon, so that this frame 8 may be very delicately balanced; and when the cloth 9 is saturated, the frame 8 will lower itself, as will be described shortly.

On the platform 1 may be seen an angle iron 14 that has the upper stop 15 and the lower stop 16, between which the stem 11 extends. Also mounted on the block 3 in a support 17 is a mercury switch 18.

Referring for the moment to Fig. 3, when the frame 8 is in its lowermost position, the mercury switch 18 will be in its cutoff position, so that the electric current 19 will be cut off, and a solenoid 20 will be actuated to close the flow of water from the water inlet or cutoff valve 21.

On the other hand, as may be seen in Fig. 4, when the frame 8 is in its uppermost position, the mercury switch 18 will be in an operative position and turn on the water through the valve 21, and through a sprayer (not shown) so that the cloth 9 in the frame 8 will be saturated, and the main valve (the saturated cloth) being delicately arranged, will lower the frame 8 to the position shown in Fig. 3.

In other words, when the cloth 9 is saturated, it will cut off the water supply; but by the time the cloth dries, so will the soil in which the flowers or plants are set become dry, and the frame 8 rising will turn on the spray for about twenty or thirty seconds and then automatically turn off the water as soon as the cloth 9 becomes saturated, and may stay off for hours.

From the foregoing, it will be seen that I have perfected a valve mechanism, which is especially adapted to be used in greenhouses; and wherein the balance is so sensitive that when the cloth herebefore mentioned is not saturated, it will allow the cloth and its frame to rise; cause the mercury switch to be in circuit; and cause the sprinkler head (not shown) to saturate the cloth; then the saturated cloth will overbalance the counter-weight and move to its lower position, cutting off the water from the inlet supply.

As heretofore mentioned, the counter-weight may be finely adjusted, and the length of time that the water is cut off will depend upon the heat and humidity in the greenhouse and the position of the counter-weight; and by the time the cloth dries so will the plants need spraying.

As before mentioned, the above described mechanism might be set out in an open field, with an irrigation plant; but in this instance, the counter-weight would have to be adjusted, as it takes more than twenty seconds to spray an open field.

Having thus described my invention what I claim as new and desire to secure by Letters Patent is:

1. In an automatic valve for use in greenhouses, including a platform, a block having a knife edge at its under-portion, standards on the platform for supporting the block, a frame extending from the front of the block to which is sewed a fabric, a stem extending to the rear of the block, an adjustable counter-weight on said stem, a mercury switch mounted on the block and electrically connected to a water supply valve; the said frame adapted to be placed beneath a sprinkler, the block being so evenly balanced that when the cloth is dry the counter-weight will tip the frame and block upwardly to actuate the said mercury switch and cut in the water supply, and when the said cloth becomes saturated it will outweigh the counter-weight and thus lower and cut off the water supply.

2. An automatic valve for use in greenhouses, including a platform, a stake secured to the platform, said stake to be driven in the soil for supporting the platform; a block having a knife edge at its under-portion; standards on the platform for supporting the block; a frame extending from the front of the block; a fabric loosely sewed to the frame; a stem extending to the rear of the block; an adjustable counter-weight on said stem; a mercury switch mounted on the block and electrically connected to a water supply valve; the said frame adapted to be placed beneath a sprinkler; stops on the platform for limiting the upward and downward tilting movement of the block; the said stem extending between the said stops; the block being so evenly balanced that when the cloth is dry the counter-weight will tip the frame and block upwardly to in turn actuate the said mercury switch and cut in the water supply, which will saturate the cloth within about twenty seconds, and at the same time the water supply will spray any plants or flowers set in the greenhouse; and when the said cloth becomes saturated, it will over-balance the counter-weight and thus lower and tip the mercury switch to cut off the water supply which water supply will stay off until the cloth again becomes dry, which would depend on the heat and humidity of the greenhouse.

References Cited in the file of this patent

UNITED STATES PATENTS

| | | |
|---|---|---|
| 2,494,819 | Lane | Jan. 17, 1950 |
| 2,717,122 | Gwaltney | Sept. 6, 1955 |